(12) United States Patent
Wiswall et al.

(10) Patent No.: US 10,713,028 B2
(45) Date of Patent: Jul. 14, 2020

(54) ON-DEMAND INSTALLER FOR RESOURCE PACKAGES

(71) Applicant: Microsoft Technology Licensing, LLC, Redmond, WA (US)

(72) Inventors: Jonathan D. Wiswall, Woodinville, WA (US); Sarjana Sheth Mitra, Yarrow Point, WA (US); John James Vintzel, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/000,796

(22) Filed: Jun. 5, 2018

(65) Prior Publication Data
US 2019/0369977 A1   Dec. 5, 2019

(51) Int. Cl.
G06F 8/60 (2018.01)
G06F 8/61 (2018.01)
G06F 8/65 (2018.01)
H04L 29/08 (2006.01)

(52) U.S. Cl.
CPC .............. *G06F 8/61* (2013.01); *G06F 8/65* (2013.01); *H04L 67/34* (2013.01)

(58) Field of Classification Search
None
See application file for complete search history.

(56) References Cited

U.S. PATENT DOCUMENTS

| 8,572,580 | B2* | 10/2013 | Sheehan | G06F 9/44536 |
| | | | | 717/121 |
| 9,086,937 | B2* | 7/2015 | Arrouye | G06F 8/61 |
| 10,069,940 | B2* | 9/2018 | Smith | H04L 67/06 |
| 2009/0007096 | A1* | 1/2009 | Chavez | G06F 21/57 |
| | | | | 717/176 |
| 2010/0023934 | A1* | 1/2010 | Sheehan | G06F 8/71 |
| | | | | 717/168 |
| 2013/0311986 | A1* | 11/2013 | Arrouye | G06F 8/61 |
| | | | | 717/175 |
| 2015/0363186 | A1* | 12/2015 | Judge | G06F 8/65 |
| | | | | 717/170 |
| 2017/0078377 | A1* | 3/2017 | Smith | H04L 67/06 |

* cited by examiner

*Primary Examiner* — S. Sough
*Assistant Examiner* — Cheneca Smith
(74) *Attorney, Agent, or Firm* — Alleman Hall Creasman & Tuttle LLP

(57) ABSTRACT

A computer device is provided that includes a processor and non-volatile memory including stored instructions executable by the processor, the stored instructions being configured to cause the processor to execute an operating system including an application programming interface for an on-demand installer that is callable by installed application programs during run-time. The on-demand installer is configured to receive a request from an application program to install a target resource package of the application program, query an installer server that is a source of an application program package of the application program to retrieve the target resource package from the installer server, and install the target resource package of the application program.

14 Claims, 5 Drawing Sheets

ON-DEMAND INSTALLER FOR RESOURCE PACKAGES

BACKGROUND

Typically, application programs are packaged into bundles that include multiple resource packages for different device capabilities and application scenarios. For example, a word application program may include language resource packages for many different languages. Currently, to conserve memory and streamline performance, computer devices may only install a subset of the available resource packages that are applicable to the user. However, if the user requires a resource package that was not initially installed with the application program, typically the user must find and download the resource package themselves, potentially degrading user experience of the application program.

SUMMARY

According to one aspect of the present disclosure, a computer device is provided. The computer device may include a processor and non-volatile memory including stored instructions executable by the processor, the stored instructions being configured to cause the processor to execute an operating system including an application programming interface for an on-demand installer that is callable by installed application programs during run-time. The on-demand installer may be configured to receive a request from an application program to install a target resource package of the application program, query an installer server that is a source of an application program package of the application program to retrieve the target resource package from the installer server, and install the target resource package of the application program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
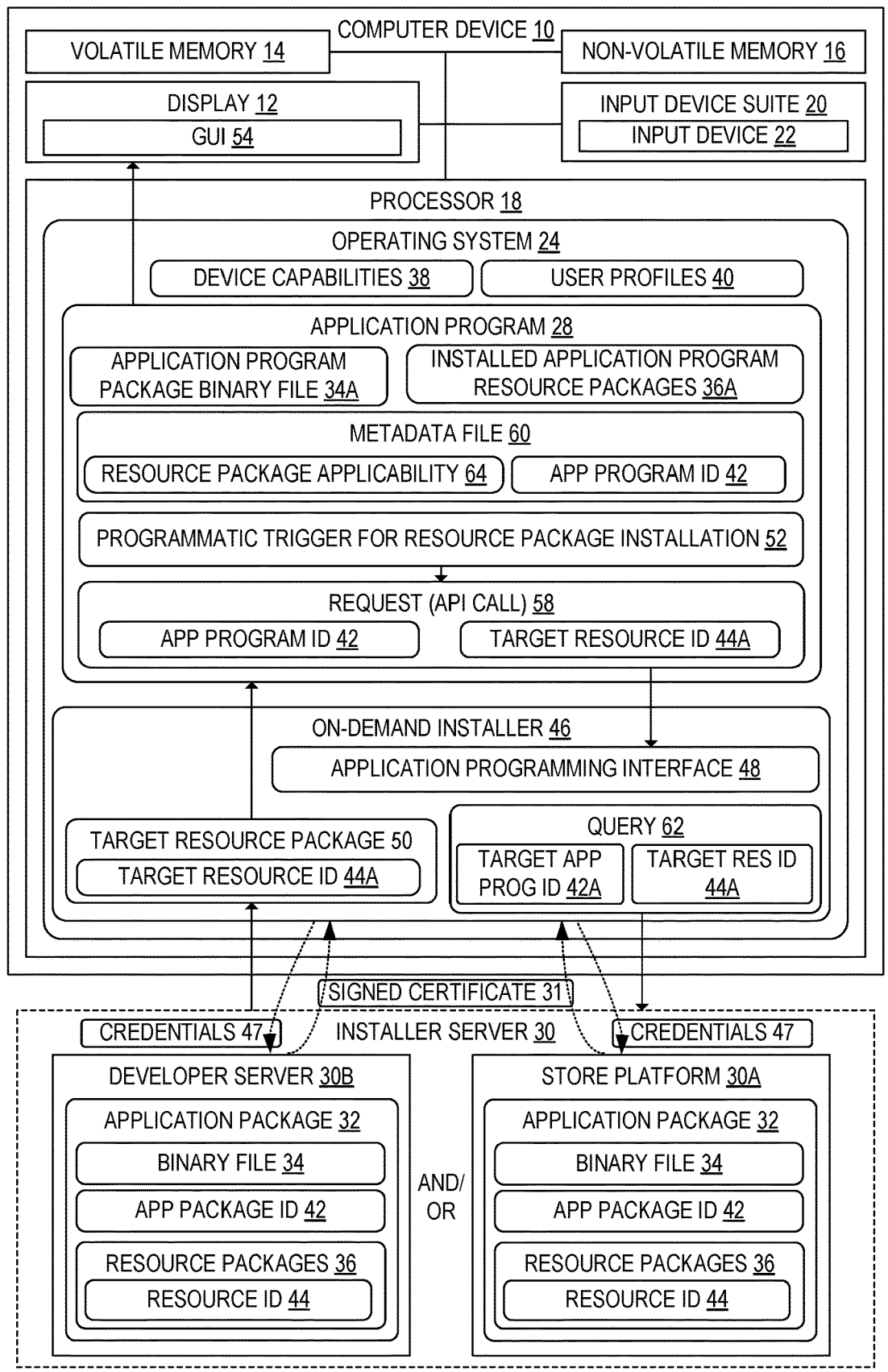
FIG. 1 shows a schematic view of an example computer device implementing an on-demand installer according to one embodiment of the present disclosure.

In order to address the difficulties discussed above, a computer device 10 is provided, as shown in the example embodiment of FIG. 1. The computer device 10 may include a display 12, volatile memory 14, non-volatile memory 16, a processor 18, and/or an input device suite 20 including one or more input devices 22. The one or more input devices 22 may include, for example, one or more of a keyboard, a mouse, a trackpad, a touchscreen, a microphone, a camera, an inertial motion unit, a global positioning system (GPS) unit, and/or some other input device 22. In addition to the display 12, the computer device 10 may further include one or more other output devices, such as a speaker, a haptic feedback unit, or another type of output device.

In one example, the computer device 10 may take the form of a desktop computer device, and the display 12 may take the form of a desktop display device. As another example, the computer device 10 may take the form of a head mounted display (HMD) device, and the display 12 may take the form of a non-see-through display in a virtual reality configuration, or a substantially see-through display in an augmented reality configuration. As yet another example, the computer device 10 may take the form of a mobile computer device, such as a smart phone device, a laptop computer device, a tablet computer device, a wearable computer device, etc. It should be appreciated that the computer device 10 and the display 12 may take other forms not specifically described above.

As illustrated in FIG. 1, the computer device 10 includes the processor 18 and non-volatile memory 16 including stored instructions executable by the processor 18, the stored instructions being configured to cause the processor 18 to execute an operating system 24 that manages installation, deletion, and execution of application programs 28 on the computer device 10. Each application program 28 may be received via a network from an installer server 30 that is a verified source for that application program 28. In one example, the installer server 30 is an application store platform 30A associated with the operating system 24 executed on the computer device 10. The application store platform 30A may be configured to store and manage application program packages 32 for each application program 28. By accessing the application store platform 30A, the user may purchase, download, and install application programs 28.

In some examples, prior to receiving an application program package 32, the processor 18 may be configured to receive an authentication certificate from the installer server 30 (e.g. application store platform 30A) in order to verify that the installer server 30 is a trusted application program publisher, and authenticate the downloaded application program package 32. As illustrated in FIG. 1, the installer server 30 has a two-way trusted relationship with the operating system 24, installer 46, and/or application program 28 executed by processor 18. In the depicted example, this two-way trusted relationship is established by on-demand installer 46 downloading and verifying a signed certificate 31 from the installer server, and by installer server 30 requesting and receiving sufficient credentials 47 from the on-demand installer to establish a secure communication session between the on-demand installer 46 and the installer server 30. Further, at store platform 30A it will be appreciated that a curating entity, such as the same entity that provides the operating system 24, vets the provenance, health, utility, and security of each application and resource package available for download on the store platform 30A. Only application and resource packages meeting the criteria of the curating entity are typically allowed in the store platform 30A. In one example, the store platform 30A contains application packages and associated resource packages from third party developers different from the curating entity of the application platform, in addition or in the alternative to first party software published by the curating entity that operates the store platform 30A. It should be appreciated that the installer server 30 may take other forms than application store platform 30A. For example, the installer server 30 may take the form of a developer server 30B that is not associated with the operating system 24 executed on the computer device 10. That is, the developer of an application program may host the application program package 32 on a server device for deployment.

As illustrated, each application program package 32 for each application program 28 may include an application program package binary file 34 and a plurality of resource packages 36. The application program package binary file 34 may include one or more binary instructions configured to be executed by the processor 18 in order to run an application program 28. In some examples, the application program package 32 may include a plurality of application program package binary files 34. For example, the application program package 32 may include binary files 34 for different computer architectures, such as, for example, 32-bit vs 64-bit.

The application program package 32 also includes a plurality of resource packages 36. For example, the plurality of resource packages 36 may include a plurality of language resource packages, a plurality of graphics resolution resource packages, a plurality of codecs resource packages, a virtual reality resource package, etc. This list is not limiting, as other types of resource packages may also be included. When the user initially selects an application program 28 from the installer server 30 for installation, the processor 18 may be configured to determine which application program package binary file 34 and resource packages 36 are applicable to a user of the computer device 10. The processor 18 may download only the subset of applicable packages of the application program package 32, and install the applicable packages on the computer device 10.

For example, the processor 18 may be configured to select the subset of applicable packages based on device capabilities 38 of the computer device 10 and user settings stored in a user profile 40 for a current user of the computer device 10. The device capabilities 38 may indicate a type of display 12 and suitable graphics resolutions, a computer architecture of the operating system 24, etc. The user settings of the user profile 40 may indicate a target language for the current user. Thus, based on the device capabilities 38 and the user profile 40, the processor 18 may be configured to download suitable application program package binary files 32 and resource packages 36 from the application program package 32. It should be appreciated that the device capabilities and user profile settings described above are merely exemplary, and that other types of device capabilities and user profile settings may be utilized to determine which packages of an application program package 32 are applicable for the user.

As illustrated in FIG. 1, the application program 28 may be installed on the computer device 10 and may include an installed application program package binary file 34A and one or more installed application program resource packages 36A. It should be appreciated that the application program packages 32 stored on the installer server 30 may include other resource packages that were not downloaded and installed on the computer device 10, such as other language resource packages, other graphics resolution resource packages, etc.

Each application program package 32 stored on the installer server 30 may include an application program package identifier 42 that is unique for the plurality of application program packages 32 managed by the installer server 30. Each resource package 36 in that application program package 32 may include a resource package identifier 44 that may be set by a developer of the application program package 32. Each application program package 32 may be structured in a predetermined manner that is known to the installer server 30, including the developer server 30B and the application store platform 30A, and the operating system 24 of the computer device 10. Thus, according to the predetermined structure of the application program packages 32, the application program package identifiers 42, and the resource package identifiers 44, the processor 18 of the computer device 10 search and select appropriate subpackages of a particular application program package 32 for download and installation.

As discussed above, the installed application program resource packages 36A for an application program 28 installed on the computer device 10 may potentially only include a subset of the resource packages 36 stored on the installer server 30 for that application program in order to conserve memory space. However, during execution of the application program 28, the user of the computer device 10 may encounter a scenario that requires other resource packages 36 that are not currently installed on the computer device 10. To manage a download and installation of the other resource package, the operating system 24 includes an on-demand installer 46 that includes an application programming interface (API) 48 that is callable by installed application programs 28 during run-time. The API 48 of the on-demand installer 46 includes a function for installing a target resource package 50 that may be called by a running application program 28.

In one example, the developer of the application program 28 may include code in the application program package binary file 34A for a programmatic trigger for resource package installation 52. That is, the developer may code a plurality of programmatic triggers 52 for different scenarios that are configured to make an API call to the API 48 of the on-demand installer 46 to install the target resource package 50 that is suitable for the particular scenario.

Figure 2:
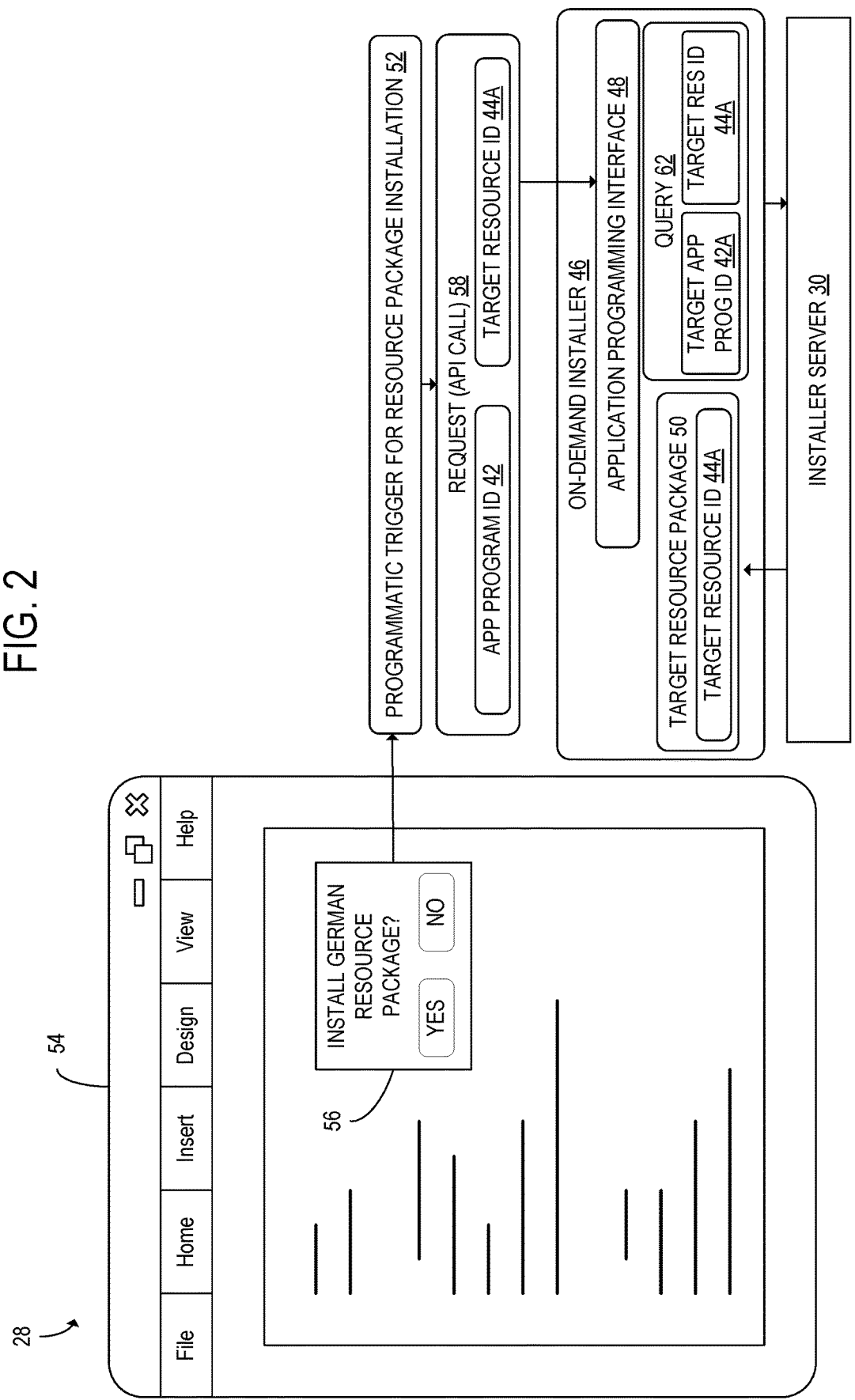
FIG. 2 shows an example graphical user interface of an application program calling an application programming interface of the on-demand installer implemented by the computer device of FIG. 1.

FIG. 2 illustrates an example application program 28 taking the form of a word processing application program. A graphical user interface (GUI) 54 of the application program 28 may be displayed on the display 12 of the computer device 10. In this example, the installed application program resource packages 36A for the example application program 28 include an English language resource package. However, in this example, the user has opened a file that includes German words, and the application program 28 does not have a German language resource package installed. The developer of the example application program 28 has included code for a programmatic trigger 52 for installation of the German language resource package that is stored on the installer server 30 in the application program package 32. In this example, upon detecting that the user has opened a file that includes German words, the application program 28 is configured to present a GUI notification 56 prompting the user to select whether they would like to install the German resource package. In response to a user input of "YES", the application program 28 may be configured to send a request 58 to download the German resource package as an API call to the API 48 of the on-demand installer 46 of the operating system 24.

The on-demand installer 46 is configured to receive the request 58 from the application program 28 to install a target resource package 50 of the application program 28. In the illustrated example, the target resource package 50 is the German language resource package. However, it should be appreciated that the target resource package 50 may take other forms, such as another type of language resource package, a graphics resolution resource package, a codecs resource package, or a virtual reality resource package. Additionally, while in this example the programmatic trigger 52 was a user action of opening a file that includes German words, it should be appreciated that developers may create any suitable programmatic trigger for other types of scenarios. For example, the programmatic trigger 52 may result from a change to the device capabilities 38, such as a change in display hardware. That is, if the user plugs in a virtual reality HMD device, a running application program 28 may be configured to detect the HMD device and trigger a programmatic trigger 52 for installing a virtual reality resource package as the target resource package 50.

After receiving the request 58 from the currently running application program 28, the on-demand installer 46 may be configured to query the installer server 30 that is the source of the application program package 32 of the application program 28 to retrieve the target resource package 40 from the installer server 30. As discussed above, the installer server 30 and the application program packages 32 stored thereon, are structured in a predetermined manner known to the operating system 24 of the computer device 10. Thus, the on-demand installer 46 is configured to probe the application program package 32 accordingly, and select the target resource package 50 for download from the installer server 30.

In one example, the on-demand installer 46 may be configured to query the installer server 30 with an application program package identifier 42 for the application program 28 and a resource package identifier 44 or the target resource package 50. As the application program 28 is currently running, the operating system 24 may be configured to determine an application program package identifier 42 for the currently running application program 28. For example, the application program package identifier 42 may be stored in a metadata file 60 generated for the application program 28 during installation. In this example, the operating system 24 may be configured to retrieve the application program package identifier 42 from the metadata file 60 stored for the currently running application program 28. The metadata file 60 may store other types of metadata, such as the resource package identifiers 44 for each resource package 36 in the application program package 32 stored on the installer server 30.

The on-demand installer 46 may be configured to determine the target resource package identifier 44A for the target resource package 50 by receiving the target resource package identifier 44A for the target resource package 50 as an argument of the request 58 from the application program 28. In one example, the developer of the application program 28 may define the resource package identifiers 44 for the application program package 32 for their application program 28. Thus, the developer may program the programmatic trigger 52 to send the target resource package identifier 44A suitable for that particular programmatic trigger 52 as an argument of the API call to the API 48 of the on-demand installer 46.

After receiving the query 62 from the on-demand installer 46, the installer server 30 may be configured to send the target resource package 50 to the on-demand installer 46 based on the target application program package identifier 42A and the target resource package identifier 44A. The on-demand installer 46 is configured to install the target resource package 50 of the application program 28. Thus, in the example illustrated in FIG. 2, after the German language resource package has been received from the installer server 30, the on-demand installer 46 may install the German language resource package for the example application 28.

Turning back to FIG. 1, the metadata file 60 stored for the application program 60 may further include a resource package applicability 64 for one or more resource packages 36 associated with the application program 28. That is, for each resource package 36 in the application program package 32 for the application program 28 stored on the installer server 30, the metadata file 60 of the application program 28 may include a resource package applicability 64 that indicates whether or not that resource package 36 is applicable to the user of the computer device 10. In one example, each of the installed application program resource packages 36A may be indicated as being applicable to the user.

In one example, based on at least installing the target resource package 50 of the application program 28, the processor 18 may be configured to update the resource package applicability 64 for the target resource package 50 to indicate that the target resource package 50 is applicable to the user of the computer device 10 running the application program 28. In one example, the operating system 24 may be configured to check for updates for resource packages 36 that are indicated to be applicable to the user. In another example, multiple users may each have a user profile 40 for the operating system 24. Thus, the resource package applicability 64 may indicate, for each resource package, whether or not that resource package is applicable to each of the multiple users. Accordingly, even though a particular resource package may be installed for the application program 28, the operating system 24 may be configured to only enable that particular resource package for the applicable users.

The metadata file 60 for the application program 28 may further include metadata for a version 66 of the application program 28. In one example, the on-demand installer 46 may be configured to periodically query the installer server 30 for updates to the application program 28 based on the metadata for the version 66 of application program 28 currently installed on the computer device 10. Based on at least an update query 68 sent to the installer server 30, the on-demand installer 46 may be configured to determine that an update is available for the application program 28 from the installer server 30. For example, the on-demand installer 46 may be configured to send the application program package identifier 42 for the application program 28 to the installer server 30, and receive updated version metadata 66U from the installer server 30. The on-demand installer 46 may be configured to compare the updated version metadata 66U to the stored version metadata 66 to determine whether there is a version difference. If there is a version difference, the on-demand installer 46 may be configured to determine that an update is available on the installer server 30.

Based on determining that an update is available, the on-demand installer 46 may be configured to send an update request 70 to the installer server 30 that includes the application program package identifier 42 of the application program 28, and a list of resource package identifiers 44 that are indicated to be applicable to the user in the resource package applicability 64 metadata. The installer server 30 may be configured to send the updated application program package 32U including any updated binary files 34U and updated resource packages 36U for the list of resource package identifiers 44 to the computer device 10.

The on-demand installer 46 may be configured to receive an update package 72 that may include updated binary files 34U and updated resource packages 36U for the applicable resource packages. After receiving the update package 72, the on-demand installer 46 may update the application program 28 and each resource package 36 that is indicated to be applicable to the user via the resource package applicability 64 in the metadata file 60.

Turning back to FIG. 1, the operating system 24 may be configured to uninstall one or more of the installed application program resource packages 36A. For example, the user may elect to uninstall the target resource package 50 after a set period of time has passed, or a current use session of the application program 28 is completed. However, it should be appreciated that the user may elect to uninstall the target resource package 50 and other installed resource packages at any other suitable time. Based on at least uninstalling the target resource package 50, the processor 18 executing the operating system 24 may be configured to update the resource package applicability 64 for the target resource package 50 to indicate that the target resource package 50 is not applicable to the user of the computer device 10 running the application program 28. When the target resource package 50 is indicated to not be applicable to the user, the on-demand installer 46 may be configured to not download an updated resource package for the target resource package 50 during periodic updates of the application program 28.

Thus, in the manner described above, the on-demand installer 46 may be configured to programmatically communicate with application programs 28 running on the computer device 10 to manage installation of resource packages as necessary without requiring the user themselves to download and install those resource packages manually.

Figure 4:
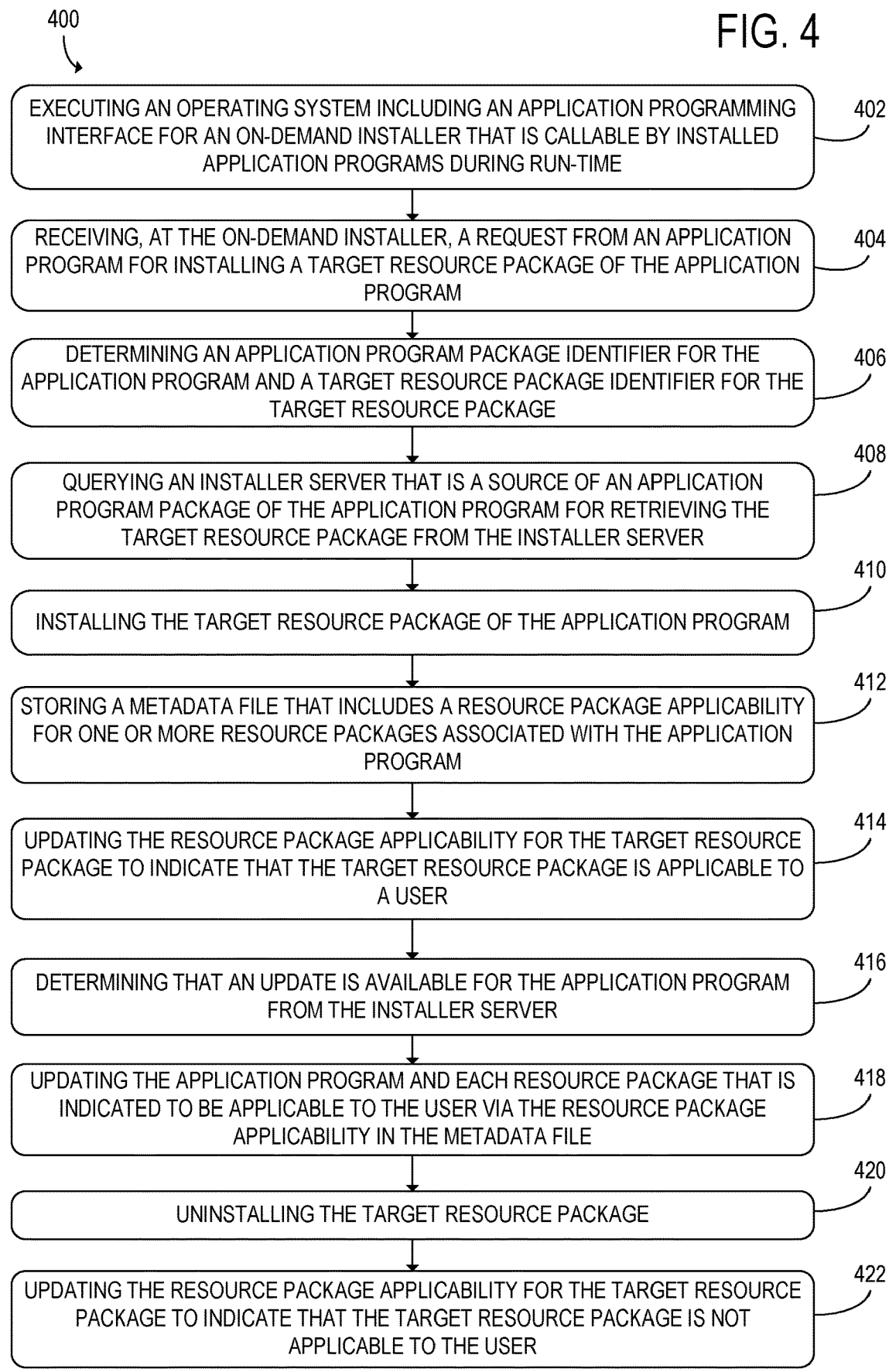
FIG. 4 shows a computer-implemented method for on-demand installation implemented by the computer device of FIG. 1.

FIG. 4 shows a flowchart of a computer-implemented method 400. The method 400 may be implemented by the computer device 10 of FIG. 1. At 402, the method 400 may include executing an operating system including an application programming interface for an on-demand installer that is callable by installed application programs during run-time. As illustrated in FIG. 1, the API 48 of the on-demand installer 46 includes a function for installing a target resource package 50 that may be called by a running application program 28. Developers may include code in their application programs for programmatic triggers that call the function of the API 48 described above with regard to FIG. 1.

At 404, the method 400 may include receiving, at the on-demand installer, a request from an application program for installing a target resource package of the application program. The request may come in the form of an API call to the API 48 of the on-demand installer. The developer of the application program may set which target resource package should be installed for each coded programmatic trigger. In the example shown in FIG. 2, the programmatic trigger of a user opening a file that includes German words triggered a request to install a German language resource package. The target resource package is not limited to language resource packages, but may also include a graphics resolution resource packages, codecs resource packages, virtual reality resource packages, etc.

At 406, the method 400 may include determining an application program package identifier for the application program and a target resource package identifier for the target resource package. In one example, the application program package identifier 42 may be stored in a metadata file 60 generated for the application program 28 during installation. In this example, the application program package identifier 42 may be retrieved from the metadata file 60 stored for the currently running application program 28. The metadata file 60 may store other types of metadata, such as the resource package identifiers 44 for each resource package 36 in the application program package 32 stored on the installer server 30. The developer of the application program may create their own resource package identifiers for the application program package stored on an installer server 30. In addition to designating the target resource package that should be installed for each coded programmatic trigger, the API call to the API 48 of the on-demand installer may also include the target resource package identifier for the target resource package as an argument.

At 408, the method 400 may include querying an installer server that is a source of an application program package of the application program for retrieving the target resource package from the installer server. In one example, the installer server is an application store platform associated with the operating system. In another example, as illustrated in FIG. 1, the installer server 30 may take the form of a developer server 30B that is not associated with the operating system 24. As illustrated in FIG. 1, the query to the installer server 30 may include the application program package identifier and the target resource package identifier. The installer server 30 is configured to search an associated database for the target resource package based on the application program package identifier and the target resource package identifier and send the target resource package to the on-demand installer.

At 410, the method 400 may include installing the target resource package of the application program. In some examples, the application program may present a GUI notification to the user to elicit a response regarding whether the user would like to restart the application program and install the target resource package immediately, or at a later time.

At 412, the method 400 may include storing a metadata file that includes a resource package applicability for one or more resource packages associated with the application program. The resource package applicability stored in metadata may be configured to indicate whether or not a particular resource package is applicable to the user of the computer device 10. In one example, the resource package applicability is per-user per-computer device. In another example, the resource package applicability is per-computer device, and applies to all users on that computer device.

At 414, the method 400 may include based on at least installing the target resource package of the application program, updating the resource package applicability for the target resource package to indicate that the target resource package is applicable to a user of the computer device running the application program. In one example, the method may include checking for updates for resource packages that are indicated to be applicable to the user. In the example illustrated in FIG. 1, multiple users may each have a user profile 40 for the operating system 24. Thus, the resource package applicability 64 may indicate, for each resource package, whether or not that resource package is applicable to each of the multiple users. Accordingly, even though a particular resource package may be installed for the application program 28, the operating system 24 may be configured to only enable that particular resource package for the applicable users.

At 416, the method 400 may include determining that an update is available for the application program from the installer server. In the example illustrated in FIG. 1, the on-demand installer 46 may be configured to send the application program package identifier 42 for the application program 28 to the installer server 30, and receive updated version metadata 66U from the installer server 30. The on-demand installer 46 may be configured to compare the updated version metadata 66U to the stored version metadata 66 to determine whether there is a version difference. If there is a version difference, the on-demand installer 46 may be configured to determine that an update is available on the installer server 30.

At 418, the method 400 may include updating the application program and each resource package that is indicated to be applicable to the user via the resource package applicability in the metadata file. In the example illustrated in FIG. 1, the on-demand installer may be configured to send a list of resource package identifiers 44 that are indicated to be applicable to the user in the resource package applicability 64 metadata to the installer server 30. The installer server 30 may be configured to send the updated application program package 32U including any updated binary files 34U and updated resource packages 36U for the list of resource package identifiers 44 to the computer device 10. The on-demand installer 46 may be configured to receive an update package 72 that may include updated binary files 34U and updated resource packages 36U for the applicable resource packages, and update the application program.

At 420, the method 400 may include uninstalling the target resource package. The on-demand installer may be configured to uninstall the target resource package after a set period of time has passed, or a current use session of the application program 28 is completed. However, it should be appreciated that the user may elect to uninstall the target resource package 50 and other installed resource packages at any other suitable time.

At 422, the method 400 may include updating the resource package applicability for the target resource package to indicate that the target resource package is not applicable to the user of the computer device running the application program. Thus, the target resource package will not be redownloaded when the application program is updated.

In some embodiments, the methods and processes described herein may be tied to a computing system of one or more computing devices. In particular, such methods and processes may be implemented as a computer-application program or service, an application-programming interface (API), a library, and/or other computer-program product.

Figure 3:
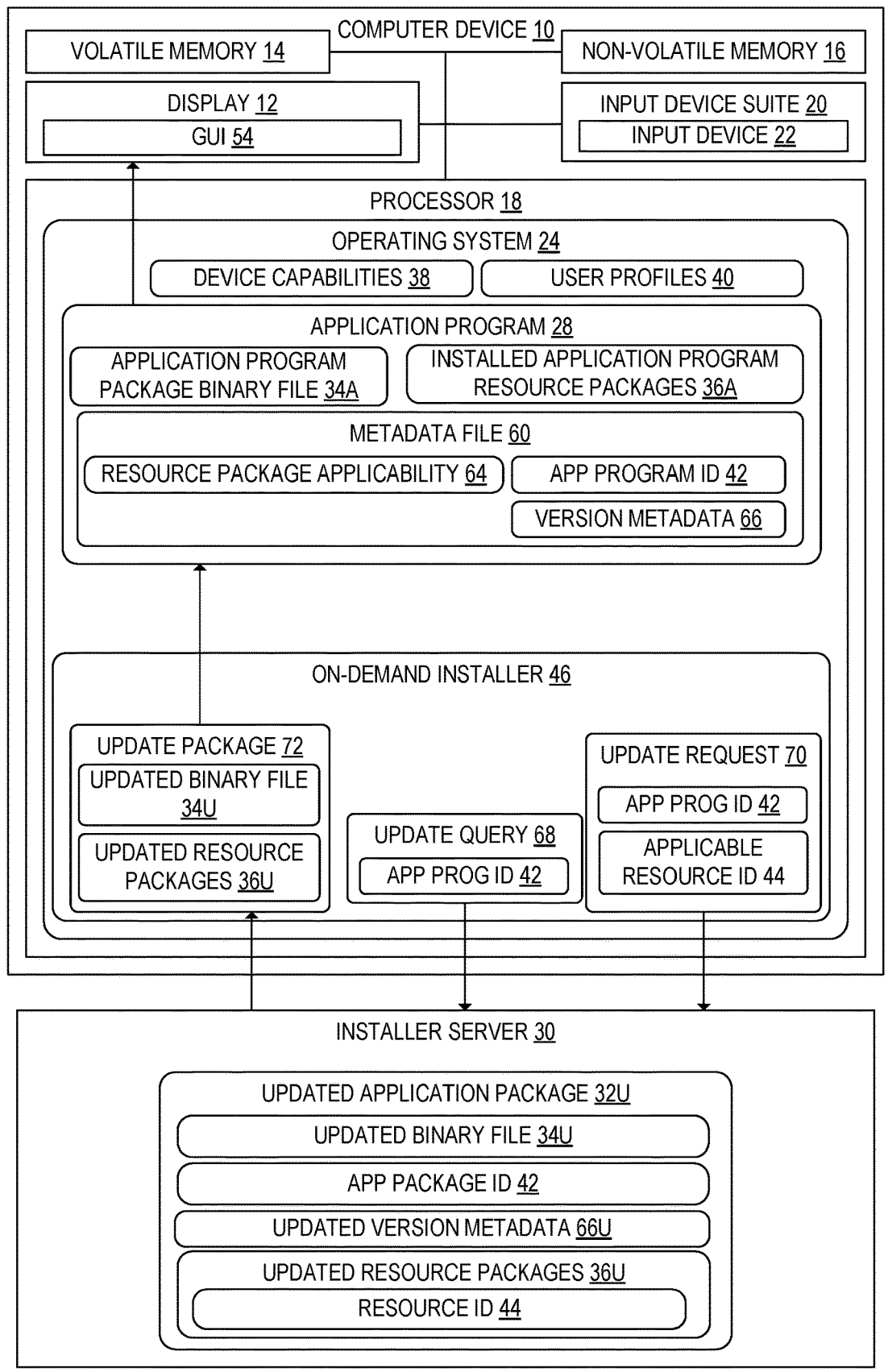
FIG. 3 shows a schematic view of the example computer device of FIG. 1 for updating an application program with the on-demand installer.
Figure 5:
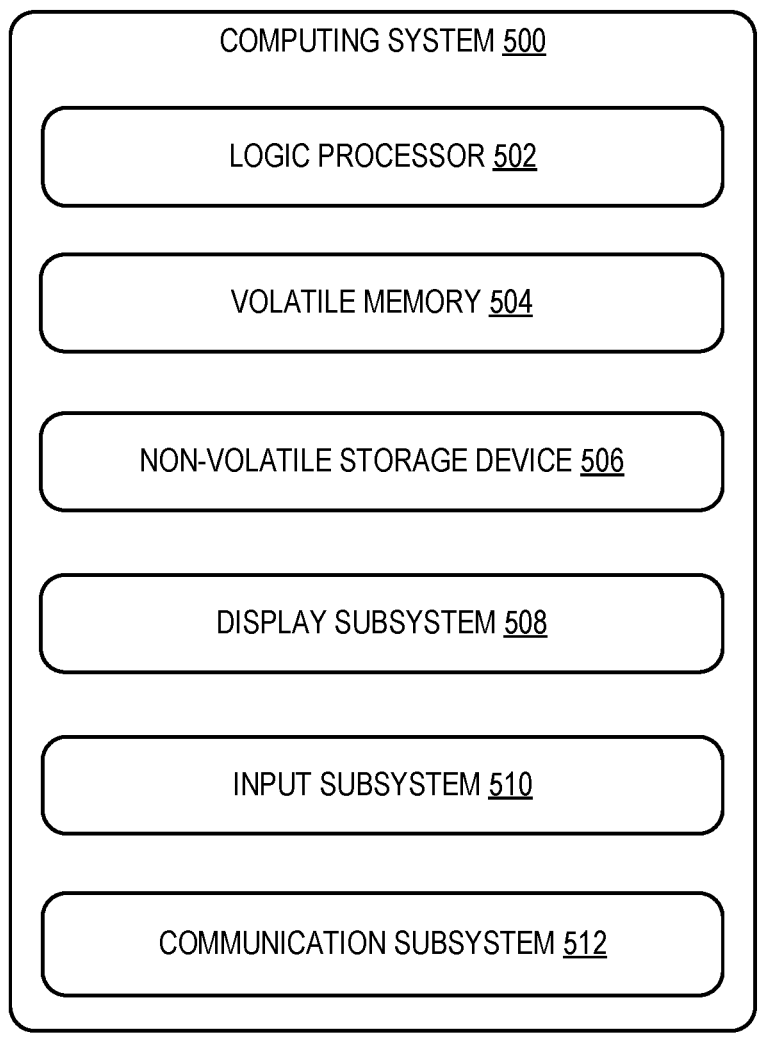
FIG. 5 shows a schematic representation of an example computing system, according to one embodiment of the present disclosure.

FIG. 5 schematically shows a non-limiting embodiment of a computing system 500 that can enact one or more of the methods and processes described above. Computing system 500 is shown in simplified form. Computing system 500 may embody the computer device 10 and the installer server 30 described above and illustrated in FIGS. 1 and 3. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 5.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 504 may be transformed—e.g., to hold different data.

Non-volatile storage device 506 may include physical devices that are removable and/or built-in. Non-volatile storage device 504 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The following paragraphs provide additional support for the claims of the subject application. One aspect provides a computer device comprising a processor and non-volatile memory including stored instructions executable by the processor, the stored instructions being configured to cause the processor to execute an operating system including an application programming interface for an on-demand installer that is callable by installed application programs during run-time. The on-demand installer is configured to receive a request from an application program to install a target resource package of the application program, query an installer server that is a source of an application program package of the application program to retrieve the target resource package from the installer server, and install the target resource package of the application program. In this aspect, additionally or alternatively, the on-demand installer may be further configured to determine an application program package identifier for the application program and a target resource package identifier for the target resource package, and query the installer server with the application program package identifier and the target resource package identifier. In this aspect, additionally or alternatively, the on-demand installer may be further configured to receive the target resource package identifier for the target resource package as an argument of the request from the application program. In this aspect, additionally or alternatively, the stored instructions may be further configured to cause the processor to store a metadata file that includes a resource package applicability for one or more resource packages associated with the application program. In this aspect, additionally or alternatively, the stored instructions may be further configured to cause the processor to, based on at least installing the target resource package of the application program, update the resource package applicability for the target resource package to indicate that the target resource package is applicable to a user of the computer device running the application program. In this aspect, additionally or alternatively, the on-demand installer may be further configured to determine that an update is available for the application program from the installer server, and update the application program and each resource package that is indicated to be applicable to the user via the resource package applicability in the metadata file. In this aspect, additionally or alternatively, the stored instructions may be further configured to cause the processor to uninstall the target resource package, and update the resource package applicability for the target resource package to indicate that the target resource package is not applicable to the user of the computer device running the application program. In this aspect, additionally or alternatively, the installer server may be an application store platform associated with the operating system. In this aspect, additionally or alternatively, the target resource package may be selected from the group consisting of a language resource package, a graphics resolution resource package, a codecs resource package, and a virtual reality resource package.

Another aspect provides a method comprising, at a computer device including a processor, executing an operating system including an application programming interface for an on-demand installer that is callable by installed application programs during run-time. The method may further comprise receiving, at the on-demand installer, a request from an application program for installing a target resource package of the application program, querying an installer server that is a source of an application program package of the application program for retrieving the target resource package from the installer server, and installing the target resource package of the application program. In this aspect, additionally or alternatively, the method may further comprise determining an application program package identifier for the application program and a target resource package identifier for the target resource package, and querying the installer server with the application program package identifier and the target resource package identifier. In this aspect, additionally or alternatively, the method may further comprise receiving the target resource package identifier for the target resource package as an argument of the request from the application program. In this aspect, additionally or alternatively, the method may further comprise storing a metadata file that includes a resource package applicability for one or more resource packages associated with the application program. In this aspect, additionally or alternatively, the method may further comprise, based on at least installing the target resource package of the application program, updating the resource package applicability for the target resource package to indicate that the target resource package is applicable to a user of the computer device running the application program. In this aspect, additionally or alternatively, the method may further comprise determining that an update is available for the application program from the installer server, and updating the application program and each resource package that is indicated to be applicable to the user via the resource package applicability in the metadata file. In this aspect, additionally or alternatively, the method may further comprise uninstalling the target resource package, and updating the resource package applicability for the target resource package to indicate that the target resource package is not applicable to the user of the computer device running the application program. In this aspect, additionally or alternatively, the installer server may be an application store platform associated with the operating system. In this aspect, additionally or alternatively, the target resource package may be selected from the group consisting of a language resource package, a graphics resolution resource package, a codecs resource package, and a virtual reality resource package.

Another aspect provides a computer device comprising a processor and non-volatile memory including stored instructions executable by the processor, the stored instructions being configured to cause the processor to execute an operating system including an application programming interface for an on-demand installer that is callable by installed application programs during run-time and configured to communicate with an application store platform associated with the operating system. The on-demand installer is configured to receive a request from an application program to install a target resource package of the application program, the request including a target resource package identifier for the target resource package, programmatically search the application store platform for the target resource package based on the target resource package identifier, retrieve the target resource package from the application store platform, and install the target resource package of the application program. In this aspect, additionally or alternatively, the request from the application program to install the target resource package may be programmatically triggered by the application program.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method comprising:
at a computer device including a processor:
executing an operating system including an application programming interface for an on-demand installer that is callable by installed application programs during run-time;
storing a user profile including device capabilities of the computer device and user settings for a user;
generating a metadata file that indicates a resource package applicability for a plurality of resource packages of an application program based on the stored user profile;
installing each resource package of the plurality of resource packages that is indicated to be applicable to the user in the metadata file;
receiving, at the on-demand installer, a request from an application program for installing a target resource package of the application program that was not indicated to be applicable to the user in the metadata file and is currently not installed;
querying an installer server that is a source of an application program package of the application program for retrieving the target resource package from the installer server;
installing the target resource package of the application program;
updating the metadata file to indicate that the target resource package installed based on receiving the request from the application program is applicable to the user;
determining that an update is available for the application program from the installer server; and
sending an update request to the installer server for updating the application program and one or more resource packages that are indicated to be applicable to the user via the resource package applicability indicated by the metadata file.

2. The method of claim 1, further comprising:
determining an application program package identifier for the application program and a target resource package identifier for the target resource package; and
querying the installer server with the application program package identifier and the target resource package identifier.

3. The method of claim 1, further comprising receiving the target resource package identifier for the target resource package as an argument of the request from the application program.

4. The method of claim 1, further comprising:
uninstalling the target resource package; and
updating the resource package applicability for the target resource package to indicate that the target resource package is not applicable to the user of the computer device running the application program.

5. The method of claim 1, wherein the installer server is an application store platform associated with the operating system.

6. The method of claim 1, wherein the target resource package is selected from the group consisting of a language resource package, a graphics resolution resource package, a codecs resource package, and a virtual reality resource package.

7. A computer device comprising:
a processor and non-volatile memory including stored instructions executable by the processor, the stored instructions being configured to cause the processor to:

execute an operating system including an application programming interface for an on-demand installer that is callable by installed application programs during run-time;

store a user profile including device capabilities of the computer device and user settings for a user;

wherein the on-demand installer is configured to:

generate a metadata file that indicates a resource package applicability for a plurality of resource packages of an application program based on the stored user profile;

install each resource package of the plurality of resource packages that is indicated to be applicable to the user in the metadata file;

receive a request from an application program to install a target resource package of the application program that was not indicated to be applicable to the user in the metadata file and is currently not installed;

query an installer server that is a source of an application program package of the application program to retrieve the target resource package from the installer server;

install the target resource package of the application program;

update the metadata file to indicate that the target resource package installed based on receiving the request from the application program is applicable to the user;

determine that an update is available for the application program from the installer server; and send an update request to the installer server for updating the application program and one or more resource packages that are indicated to be applicable to the user via the resource package applicability indicated by the metadata file.

8. The computer device of claim 7, wherein the on-demand installer is further configured to:

determine an application program package identifier for the application program and a target resource package identifier for the target resource package; and query the installer server with the application program package identifier and the target resource package identifier.

9. The computer device of claim 7, wherein the on-demand installer is further configured to receive the target resource package identifier for the target resource package as an argument of the request from the application program.

10. The computer device of claim 7, wherein the stored instructions are further configured to cause the processor to:

uninstall the target resource package; and update the resource package applicability for the target resource package to indicate that the target resource package is not applicable to the user of the computer device running the application program.

11. The computer device of claim 7, wherein the installer server is an application store platform associated with the operating system.

12. The computer device of claim 7, wherein the target resource package is selected from the group consisting of a language resource package, a graphics resolution resource package, a codecs resource package, and a virtual reality resource package.

13. A computer device comprising:

a processor and non-volatile memory including stored instructions executable by the processor, the stored instructions being configured to cause the processor to:

execute an operating system including an application programming interface for an on-demand installer that is callable by installed application programs during run-time and configured to communicate with an application store platform associated with the operating system;

store a user profile including device capabilities of the computer device and user settings for a user;

wherein the on-demand installer is configured to:

generate a metadata file that indicates a resource package applicability for a plurality of resource packages of an application program based on the stored user profile;

install each resource package of the plurality of resource packages that is indicated to be applicable to the user in the metadata file;

receive a request from an application program to install a target resource package of the application program that was not indicated to be applicable to the user in the metadata file and is currently not installed, the request including a target resource package identifier for the target resource package;

programmatically search the application store platform for the target resource package based on the target resource package identifier;

retrieve the target resource package from the application store platform;

install the target resource package of the application program; and update the metadata file to indicate that the target resource package installed based on receiving the request from the application program is applicable to the user;

determine that an update is available for the application program from an installer server; and send an update request to the installer server for updating the application program and one or more resource packages that are indicated to be applicable to the user via the resource package applicability indicated by the metadata file.

14. The computer device of claim 13, wherein the request from the application program to install the target resource package is programmatically triggered by the application program.

* * * * *